(12) United States Patent
Idzik et al.

(10) Patent No.: US 8,179,093 B2
(45) Date of Patent: *May 15, 2012

(54) HANDHELD ELECTRONIC DEVICE WITH HOLSTER HAVING A NOTIFICATION DEVICE

(75) Inventors: Jacek S. Idzik, Waterloo (CA); Siong LiTingTun, Cambridge (CA)

(73) Assignee: Research In Motion Limited, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 12/952,419

(22) Filed: Nov. 23, 2010

(65) Prior Publication Data

US 2011/0063104 A1    Mar. 17, 2011

Related U.S. Application Data

(63) Continuation of application No. 11/871,396, filed on Oct. 12, 2007, now Pat. No. 7,863,862.

(51) Int. Cl.
*H01M 10/44* (2006.01)
*H01M 10/46* (2006.01)

(52) U.S. Cl. .................................... 320/114

(58) Field of Classification Search .............. 320/107, 320/112, 114, 115; 455/403
See application file for complete search history.

(56) References Cited

U.S. PATENT DOCUMENTS

| 5,353,017 | A | 10/1994 | Suzuki et al. |
| 5,551,079 | A * | 8/1996 | Panther et al. ........... 455/347 |
| 5,914,585 | A | 6/1999 | Grabon |
| 6,184,654 | B1 * | 2/2001 | Bachner et al. ........... 320/114 |
| 6,674,358 | B1 | 1/2004 | Tinsley |
| 2003/0030412 | A1 | 2/2003 | Matsuda et al. |
| 2003/0155887 | A1 | 8/2003 | Bourilkov et al. |
| 2003/0178967 | A1 | 9/2003 | Khatri |
| 2005/0189913 | A1 | 9/2005 | Vitanov et al. |
| 2006/0226805 | A1 * | 10/2006 | Yu ........................... 320/107 |

FOREIGN PATENT DOCUMENTS

| DE | 10305477 A1 | 8/2004 |
| EP | 0274279 A | 7/1988 |
| EP | 0274279 A2 | 7/1988 |
| EP | 1569315 A1 | 8/2005 |

(Continued)

OTHER PUBLICATIONS

Extended European Search Reported for corresponding European Patent Application No. 10188115.9 dated Mar. 8, 2011; 6 pages.

(Continued)

*Primary Examiner* — Edward Tso
(74) *Attorney, Agent, or Firm* — Ridout & Maybee LLP

(57) ABSTRACT

A handheld electronic device that includes a first battery and a holster that includes a second battery and a charging apparatus. When the handheld electronic device and the holster are electrically connected together, the charging apparatus charges the first battery on the handheld electronic device from the second battery on the holster when the first battery charge has been depleted to a given level and the second battery charge is above a second given level. Alternatively, if the first battery charge is above a third given level the first battery charges the second battery if the second battery is not fully charged. The holster further includes a microcontroller that communicates with a microprocessor on the handheld electronic device to identify alerts and activate a notification device powered by the second battery on the holster.

19 Claims, 8 Drawing Sheets

FOREIGN PATENT DOCUMENTS

| | | | |
|---|---|---|---|
| EP | 1600907 | A | 11/2005 |
| EP | 1600907 | A1 | 11/2005 |
| GB | 2352887 | A | 7/2001 |
| GB | 2386267 | A | 10/2003 |
| JP | 2006-260183 | | 9/2006 |
| JP | 2006260183 | A | 9/2006 |
| WO | 99/53621 | A | 10/1999 |
| WO | 99/53621 | A1 | 10/1999 |

OTHER PUBLICATIONS

Office Action from corresponding Canadian Patent Application No. 2,640,903; dated Jun. 29, 2011; 3 pages.

* cited by examiner

HANDHELD ELECTRONIC DEVICE WITH HOLSTER HAVING A NOTIFICATION DEVICE

CROSS REFERENCE TO RELATED APPLICATIONS

This application is a continuation of U.S. application Ser. No. 11/871,396 entitled "Handheld Electronic Device with Holster Having a Notification Device" which was filed on Oct. 12, 2007, now U.S. Pat. No. 7,863,862 which is related to U.S. application Ser. No. 11/556,547, filed Nov. 3, 2006 which issued as U.S. Pat. No. 7,554,289 on Jun. 30, 2009, both of which are incorporated herein.

BACKGROUND

1. Field

The present disclosure relates generally to handheld electronic devices and, more particularly, to an electronic device having an intelligent holster that can communicate a state of the device to a user.

2. Background

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable and thus are small and battery powered. While some handheld electronic devices include a wireless communication capability, other handheld electronic devices are stand alone devices that do not communicate with other devices.

A battery of a handheld electronic device typically constitutes a significant portion of the weight of the handheld electronic device. While it is often desirable to reduce the weight and shrink the form factor of a handheld electronic device, it is nevertheless necessary to provide sufficient battery power and capacity to enable the handheld electronic device to function properly for an appropriate duration of time. Power consumption can be of particular importance in handheld electronic devices having a wireless capability that complies with GPRS/GSM operating guide lines, since a power amplifier of such a handheld electronic device can have a peak current requirement of up to about 2.5 amperes during transmission bursts.

Furthermore, the annunciators on handheld electronic devices are often masked or muffled when the handheld electronic devices are in a holster. For example, at times a user will miss an appointment because a vibrator announcing the appointment was muffled by a holster.

It would be desirable to provide an improved handheld electronic device having a reduced weight and/or a smaller form factor than currently known devices without sacrificing battery power or battery life. It would be further desirable to provide such a device that can communicate better with a user when the device is in a holster.

BRIEF DESCRIPTION OF THE DRAWINGS

A further understanding of the device and method disclosed herein can be gained from the following description of exemplary embodiments when read in conjunction with the accompanying drawings in which.

DESCRIPTION OF THE EXEMPLARY EMBODIMENTS

Figure 3:
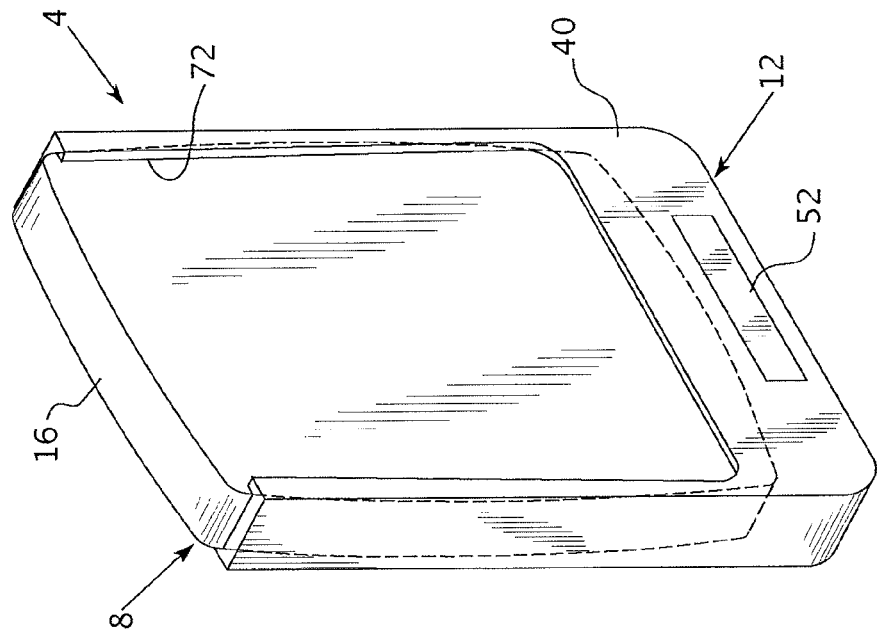
FIG. 3 is an isometric view of an improved electronic device in accordance with another exemplary embodiment described herein.
Figure 1:
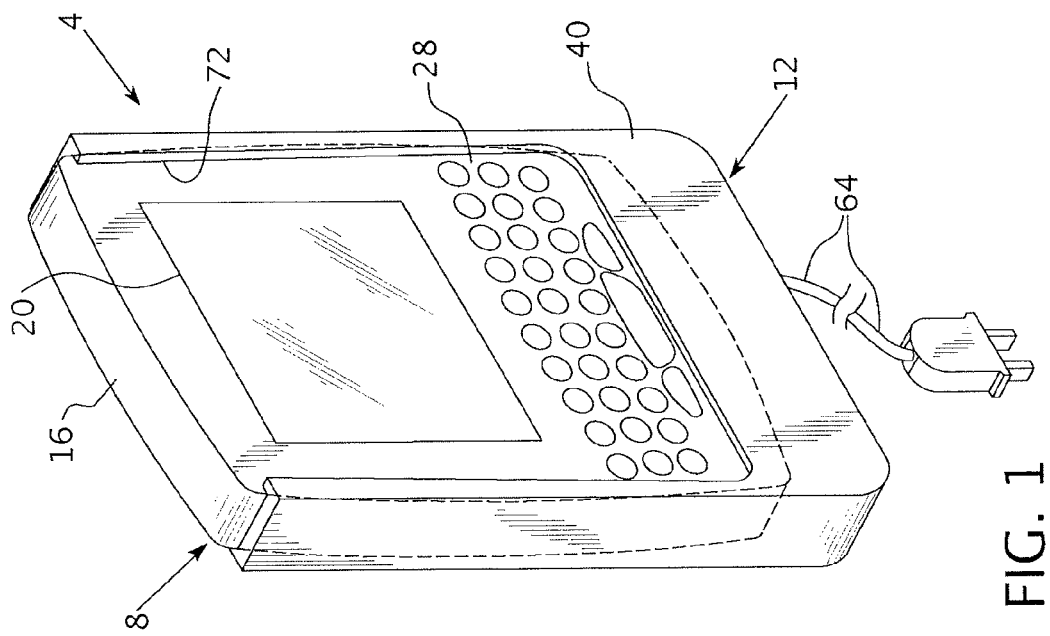
FIG. 1 is an isometric view of an improved electronic device in accordance with the exemplary embodiments described herein that includes an improved handheld electronic device and an improved holder.

An improved electronic device 4 is indicated generally in FIGS. 1-5. The electronic device 4 includes an improved handheld electronic device 8 and an improved holster 12. The holster 12 cooperates with the handheld electronic device 8, as will be set forth in greater detail below. Examples of handheld electronic devices are disclosed in U.S. Pat. Nos. 6,452,588 and 6,489,950.

The handheld electronic device 8 includes a housing 16, a display 20, a processor 24, a keyboard 28, and a first battery 32. The processor 24 can be any of a wide variety of processors, such as, without limitation, a microprocessor (μP). The processor 24 is operable to receive inputs from the keyboard 28 and to provide processed output to the display 20. The first battery 32 provides power to the processor 24 and the display 20. The handheld electronic device 8 additionally includes a plurality of contacts 36 that are disposed on the housing 16 and are electrically connected with the battery 32.

Figure 4:
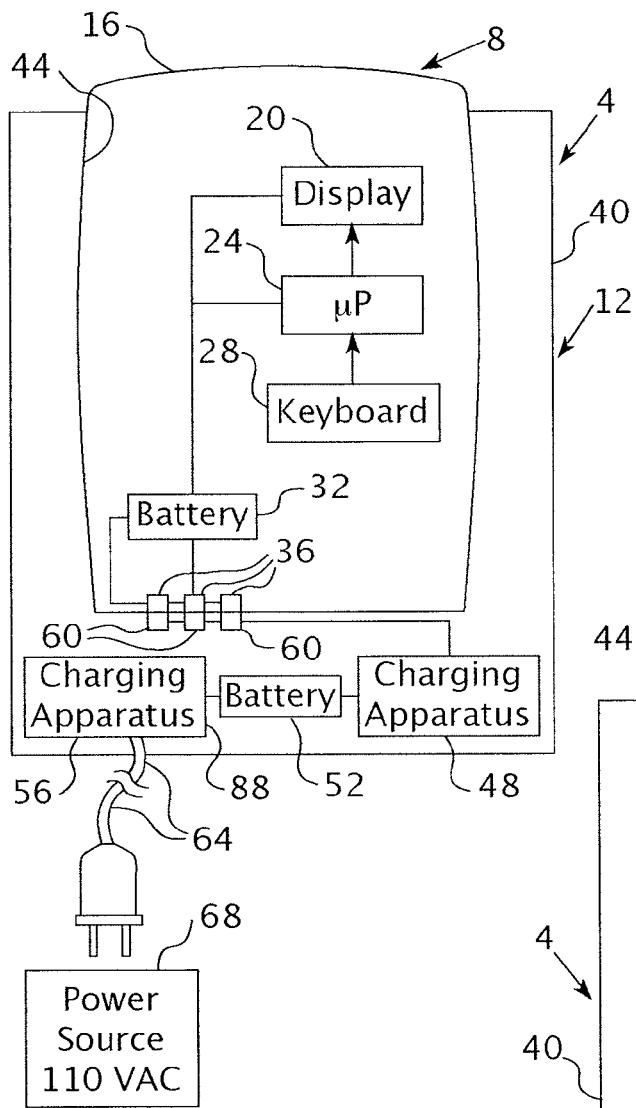
FIG. 4 is a block diagram of the electronic device of FIG. 1.
Figure 5:
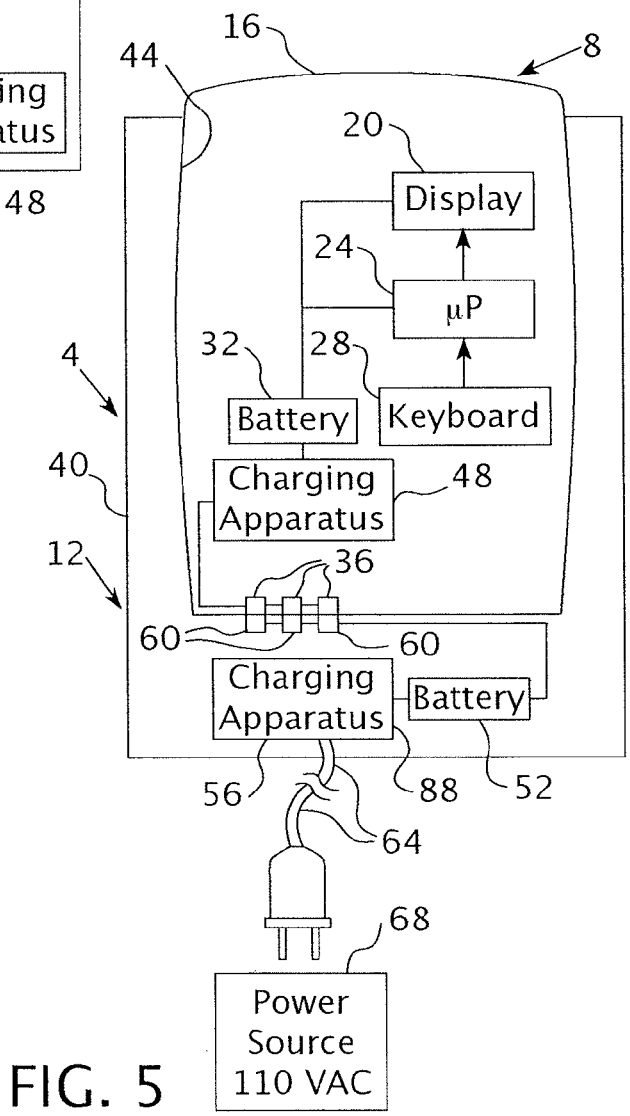
FIG. 5 is a block diagram of the electronic device in accordance with another exemplary embodiment described herein.

The holder or holster 12 includes a housing 40 formed with a cavity 44, a first charging apparatus 48, a second battery 52 and a second charging apparatus 56 (shown in FIG. 4). The first charging apparatus 48 and the second charging apparatus 56 are both electrically connected with the second battery 52. The holster 12 additionally includes a plurality of second contacts 60 (shown in FIG. 4) disposed on the housing 40 within the cavity 44 and, in the presently described exemplary embodiment depicted in FIGS. 1, 2, 4 and 5, includes a power cord 64. The power cord (64) is electrically connectable with a suitable external power source 68 (illustrated in FIG. 4) which, in the present example, is a 110 volt AC power source, though, as will be appreciated in the art, the external power source 68 may also be a USB port. It should be noted that the second charging apparatus 56 and the external power cord 64 are optional and are provided for convenience. As will be appreciated from the description provided below, the battery 52 may be charged from the battery 32 on the handheld electronic device 8. The second contacts 60 are electrically connectable with the first contacts 36 of the handheld electronic device 8. The housing 40 includes an opening 72 formed therein that enables the user to gain access to the keyboard 28 and observe the display 20 when the handheld device 8 is received in a first orientation (illustrated in FIG. 1) in the housing 40.

Additionally, the functionality of the whole system 4 can be enhanced by having the holster 12 indicate the state of the handheld electronic device 8 when the device 8 is holstered.

Typically, when a device is holstered, the various alerts that it uses to communicate its state tend to be muffled. The user can then miss important events, such as incoming phone calls, incoming e-mail alerts and other text messages, approaching appointments, etc. Generally, in modern devices, the above alert types are highly customizable. For example, through the use of polyphonic sound synthesizers and CallerID™, it is possible to assign unique ring tones to phone numbers in a pre-programmed user's list. Similarly, the capability currently exists to assign different alert types based on e-mail importance or sender. Accordingly, the notification device controlled by the handheld electronic device can be programmed to have a plurality of signal patterns, each corresponding to a different state of the handheld electronic device. For example, the state of the handheld electronic device 8 could be the arrival of an e-mail and the signal pattern could correspond to the relative importance of the e-mail. Furthermore, the relative importance of the e-mail could be determined from the address of the sender. To take advantage of this additional functionality, in accordance with the exemplary embodiments described hereafter, some minor modifications have to be made to the microprocessor 24 to communicate the alerts to the holster 12 and some hardware has to be embedded in the holster to interpret the incoming signal from the processor 24 and annunciate the alert, all of which will be described hereafter.

Figure 2:
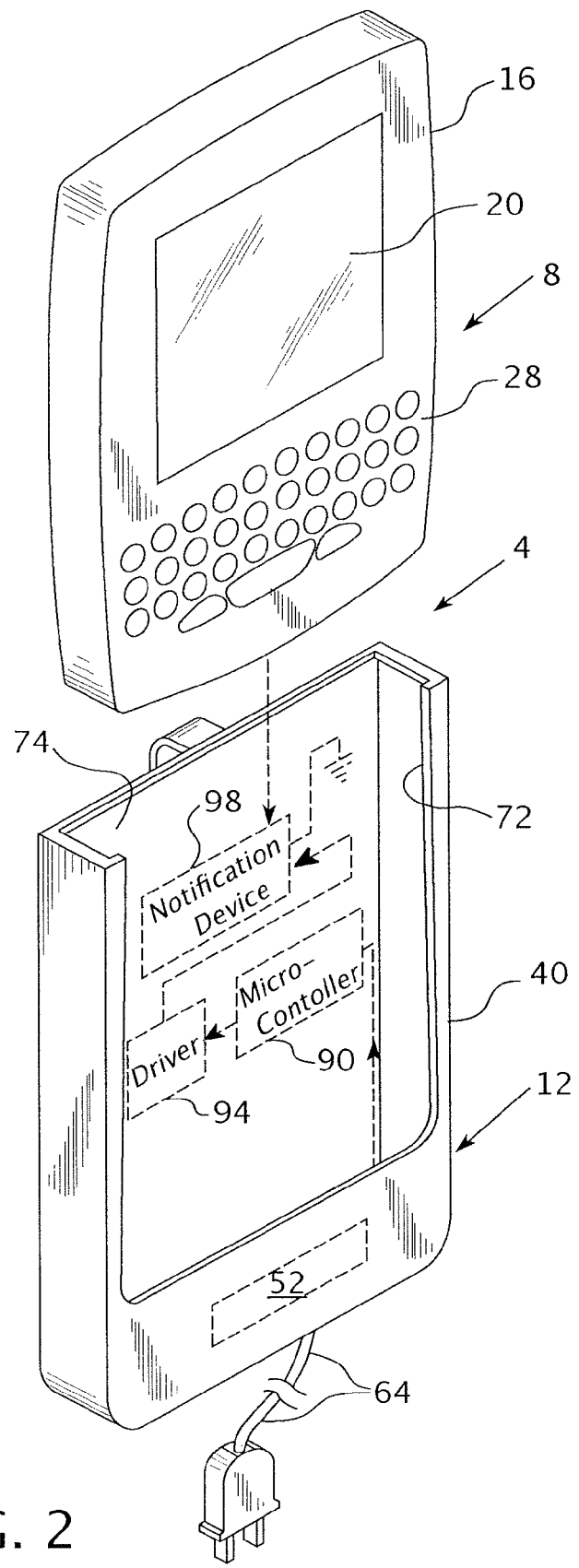
FIG. 2 is an exploded isometric view of the improved electronic device of FIG. 1.

In the first instance, the exemplary embodiments described herein address the limited battery life of handheld devices by supplementing the charge stored in the handheld battery 32 with charge stored in an additional battery 52 built into the holster 12 through the built-in charging contacts 36 of the handheld electronic device 8 and the built-in mating charging contacts 60 of the holster 12. The exemplary embodiments described herein also do away with the problem of a user charging and carrying two separate batteries by effectively hiding the second battery 52 within an accessory, in this case the holster 12. New flexible battery technologies will allow the secondary battery to be built into plastic holsters or be woven into leather holsters. Finally, the exemplary embodiments described herein add intelligence to the holster 12 by adding a microcontroller 90, driver 94 and notification device 98 to the holster 12 as shown in FIG. 2, preferably all powered by the second battery 52 in the holster 12.

Thus the exemplary embodiments described herein include a second battery 52 sealed within the holster 12 to provide additional charge to the primary handheld battery 32 through the charge contacts 36 and 60 should the primary battery 32 fall below a preset charge level, and power the electronics embedded in the holster 12. Included as part of the device and method described herein is an algorithm which controls the charging and discharging of the secondary battery 52 without the use of charging port 64 on the holster 12. Thus, the object of this exemplary embodiment is to have a battery 52 in the holster 12 that will act to supplement the device battery 32, thereby increasing the apparent operating time of the device and support intelligent communication between the device 8 and the holster 12. Several advantages are additionally contemplated to make the added capability of the electronic device 4 described herein more attractive to the user. In the first instance, the holster battery 52 is preferably thin so as not to make the holster 12 bulky. Li-polymer cells satisfy this criterion. Accordingly, the holster battery 52 can be made very thin, and yet have a very large area for increased energy storage capacity. Secondly, modifications made to the electronic device are desirably minimal. Thirdly, the brunt of the cost of the modification may be borne by the improvement made to the holster 12 so as not to saddle those users that don't want to bear the cost of this improvement. Lastly, the holster battery 52 can be advantageously designed so as to meet safety requirements.

In a first exemplary embodiment, the secondary battery 52 would be a fraction of the size of the primary battery 32; i.e., about 30%. This will, in most instances, permit a user to obtain an additional day or two of use before the handheld electronic device 8 has to be recharged from an external source. It is known that longer battery life improves the user's experience. Unfortunately, improving the technology of the battery 32 or providing a replaceable battery 32 increases the device cost. On the other hand, providing a higher capacity battery would increase the weight and size factors. While optimized software decreases handheld electronic device 8 battery consumption, it is effective up to a certain point.

In a second exemplary embodiment the secondary battery 52 in the holster 12 is at least approximately ⅓ larger than the operational battery 32 in the handheld electronic device 8 so that a smaller operational battery 32 with a size and capacity of about ⅓ of the current battery can be used. The operational battery 32 is installed on the handheld electronic device 8 to maintain it while the user is effectively working. The supplementary or secondary battery 52 is integrated in the holster 12. While the handheld electronic device 8 is in the holster 12 it would consume power from the supplementary battery 52 through power connectors 36 and 60 located in the bottom or back of the handheld electronic device 8. The operational battery 32 would be charged at the same time through these same contacts 36 and 60. For some applications, the average handheld electronic device 8 is in its holster 12 approximately 95% of the time so the capacity of the operational battery 32 that is residing on the handheld electronic device does not need to be as high. On the other hand, the battery 52 residing on the holster 12 can be extended in capacity since its weight would not contribute to the weight of the electronic device 8 under this arrangement. If the battery 32 is taken out of a handheld electronic device 8 such as the BlackBerry device and held in the hand, it feels surprisingly light. The BlackBerry device itself weighs 136 grams. The battery adds an additional 26 grams to the weight. Thus, in this embodiment the weight can be minimized while extending the battery life.

Under either arrangement if the power cord 64 and charging apparatus 56 are included the user would need to charge only the holster 12. The battery 32 residing on the handheld electronic device 8 would charge itself from the holster's battery 52. Moreover, the battery 32 on the handheld electronic device 8 does not need to be removable. When the battery 52 on the holster 12 is discharged and the user wants to get her/his device working right away, then he/she just takes another holster—a procedure much easier than changing the battery 32 (and the device 8 is not even required to be restarted). In this way an effective removable battery is achieved in a more cost effective and user friendly way. At the same time the overall battery life of the handheld electronic device 8 can be improved and the weight of the handheld electronic device 8 can be decreased. Whether the larger of the two batteries 32 and 52 is incorporated in the holster 12 or the handheld electronic device 8 will depend on the nature of the use of the handheld electronic device 8 and the relative times the device is situated in and out of the holster 12. If the handheld electronic device 8 is to spend extended periods of time out of the holster 12, then the larger of the two batteries 32 and 52 should be incorporated into the handheld electronic device 8. On the other hand, if the handheld electronic device 8 spends most of its time in the holster 12, then the weight of the handheld electronic device 8 can be reduced by incorporating the larger of the two batteries 32 and 52 in the holster 12. A manufacturer of the electronic device 4 can provide both options so that a user can select the option that is best suited to the way in which the user uses the electronic device 4.

Alternatively, in accordance with another embodiment, if the handheld electronic device 8 is separately charged from an external source to substantially its full charge level and the secondary battery 52 on the holster 12 is below a certain level the primary battery 32 on the handheld electronic device 8 may be used to charge the holster battery 52 each time the handheld electronic device 8 is placed within its holster. Preferably, only a preselected amount of charge, for example 100 mAhr (about 10% of the capacity of a typical handheld battery) is transferred from the handheld electronic device 8 to the holster battery 52 each time the handheld electronic device 8 is placed within the holster 12, to conserve power in the handheld electronic device 8. The handheld electronic device 8 may be separately charged from an external source, for example, when it is placed in a docking station, including charging circuitry to externally charge the handheld electronic device 8.

In accordance with this embodiment, the charge algorithm for the electronic device 4 is as follows:

1. If a fully charged handheld device 8 is placed in the holster 12 with a discharged secondary battery 52, the handheld device 8 will allow the holster battery 52 to trickle charge the handheld battery 32 through the charge contacts 36 and 60 down to a preset point of about 3.9V, or 10% of the initial capacity, so that the user does not notice significantly reduced battery life in the primary battery 32. Trickle charging is defined as charging at a small portion of the maximum specified charge rate for a particular battery. Each time a fully charged handheld electronic device 8 is inserted within the holster 12, a preset amount of charge is transferred from the primary battery 32 to the secondary battery under conditions where the secondary battery is to be charged. If the user does not recharge the handheld electronic device 8 before the primary battery 32 fully discharges, the holster battery 52 will return the battery charge before the primary battery 32 is fully discharged.
2. Alternatively, the algorithm allows the battery 52 in the holster 12 to be charged when the electronic device 4 is attached to a USB port or 110 volt external source and charge both the primary battery 32 and the secondary battery 52 while the handheld electronic device 8 is in the holster 12. The charge states set forth in the above Paragraph 1 and this Paragraph 2 may be set in a settings menu on the handheld electronic device 8.
3. After several full charge insertions of the handheld electronic device 8 into the holder 12, without drain of the primary battery 32 below a set level, which is preferably, substantially equal to the full charge level of the primary battery, the secondary battery 52 will contain a full charge and will no longer take charge from a fully charged primary battery 32.
4. During travel, or when the user is away from a charge source for an extended period, and the handheld battery reaches a preset highly discharged level, such as one bar on the screen, the handheld electronic device 8 can request charge from the secondary battery 52 to partially recharge the battery 32 on the handheld electronic device 8. In this event, with a reasonable efficiency of transfer of energy, the user may gain upwards of one or two days of use.

Figure 6:
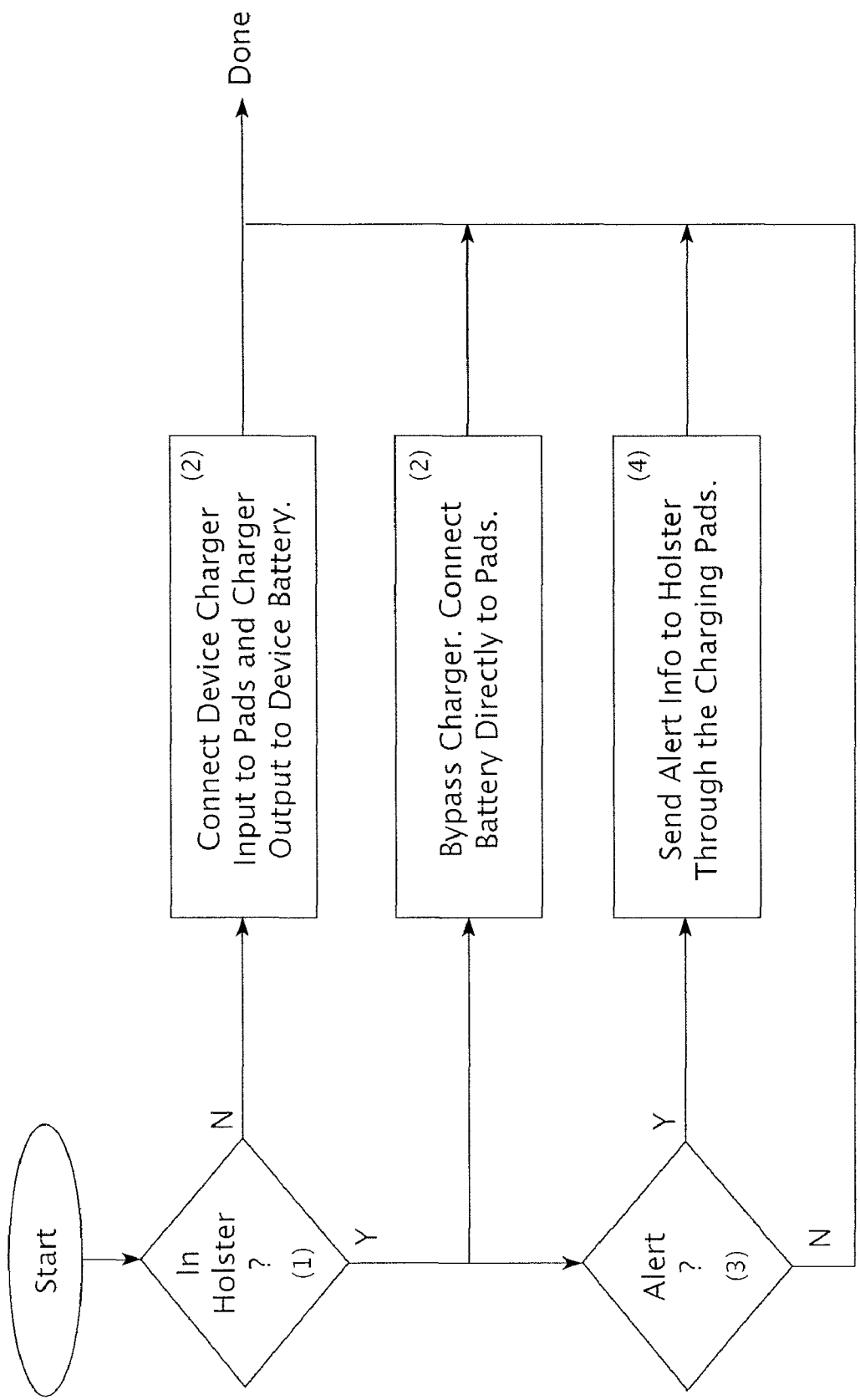
FIG. 6 is a logic flow chart of one mode of operation of the handheld electronic device described herein.
Figure 7:
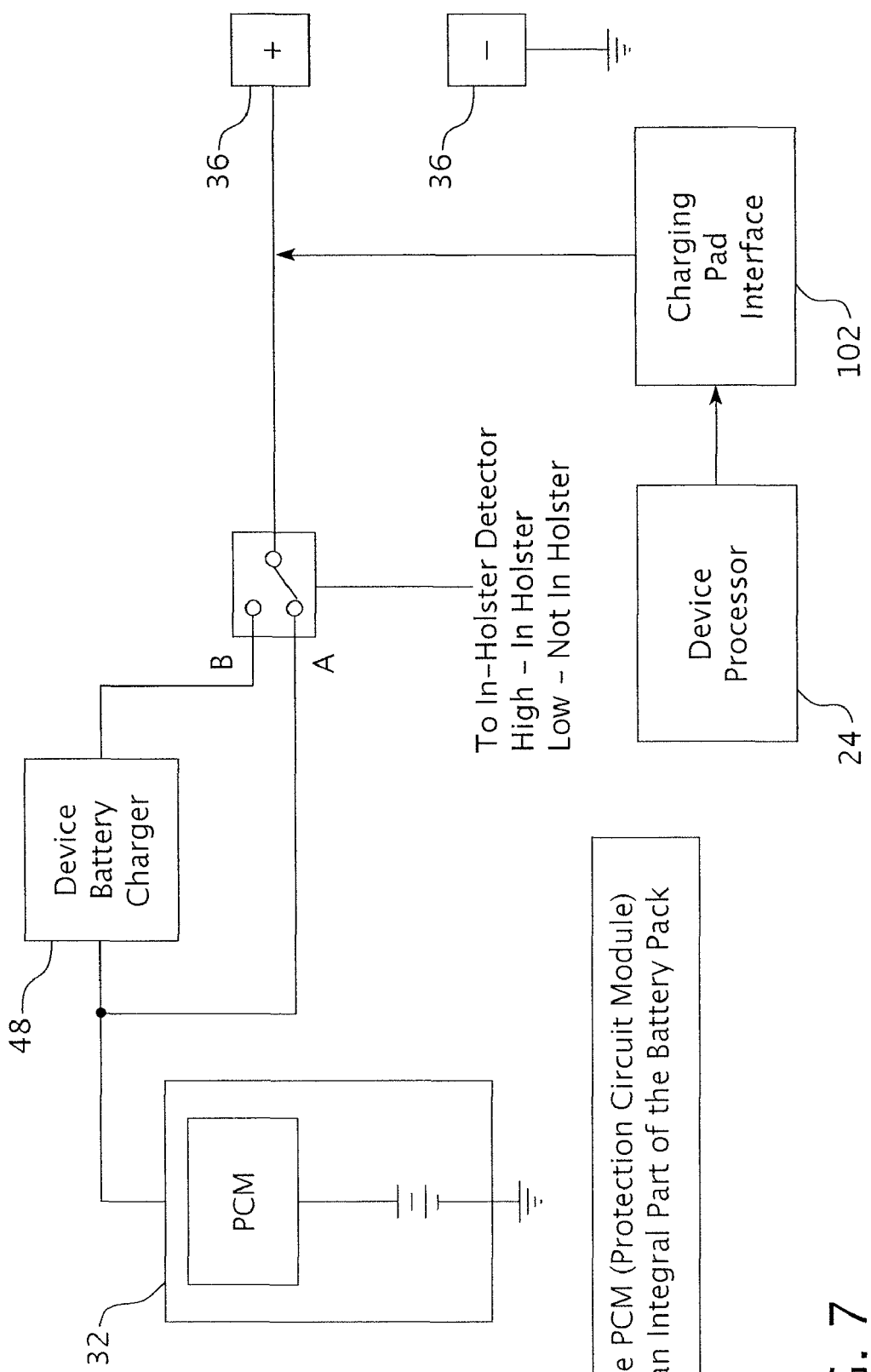
FIG. 7 is a block circuit diagram of the charging circuit of the handheld electronic device described herein.

FIGS. 6 and 7 respectively show the logic and circuitry modifications that are applied to the handheld electronic device 8 to implement this embodiment. From FIG. 6 it can be appreciated that the handheld electronic device 8 detects whether it is holstered or not. This is readily done with handheld electronic devices 8 such as a BlackBerry by the use of a magnetic reed switch (not shown) inside the handheld electronic device 8 that detects a magnetic field generated by a small permanent magnet inside the holster 12. When the handheld electronic device 8 is in the holster 12, the handheld electronic device battery charging pads 36 (shown in FIG. 4 or 5) are made directly accessible to the holster 12 "charging" pads 60 (shown in FIG. 4 or 5). Otherwise the handheld electronic device 8 charging pads 36 act just as they would normally and that is to be normal charging pads 36, such as for cradle charging. The logic for this operation is illustrated in FIG. 6 and a block diagram of the battery charging circuit for the handheld electronic device 8 is shown in FIG. 7. When the reed switch is high, that is in position A, the charging pads 36 are connected directly to the battery 32 through a protection circuit module 76 which is an integral part of the battery pack 32. The protection circuit module 76 protects the battery on the handheld device 8 from overcharging. When the reed switch 72 is low, that is position B, the handheld electronic device 8 battery charger 48 is interposed between the charging pads 36 and the battery pack 32. Thus, very little modification and expense has to be added to the handheld electronic device 8 to implement this embodiment.

The same is true for implementing the additional functionality of this embodiment that enables communication between the microprocessor 24 on the handheld device 8 and the microcontroller 90 in the holster 12. The microcontroller 90 accepts alert communications from the microprocessor 24 that are communicated through the pads 36 and 60, decodes those communications and issues the appropriate annunciation commands. The generally accepted way to implement this communication link is by sending data serially through the charging pads 36 and 60, with commands embedded in the serial data stream. This need not take additional connections beyond the two charging pads 36 and 60 that are on the holster 12 and handheld electronic device 8. A low-level data signal is made to ride on top of the DC voltage on the charging pads for this purpose. If in addition, this low-level signal is DC balanced (such as NRZ, i.e., Non-return-to-zero), then the overall DC level on the pads is not changed, and the charging scheme detailed earlier is not affected. The logic for implementing this additional functionality is shown in FIG. 6 and FIG. 7 shows the microprocessor 24 communicating with the charging pads 36 through an interface circuit 102. The interface circuit 102 implements the low-level, DC balanced signaling protocol.

Figure 8:
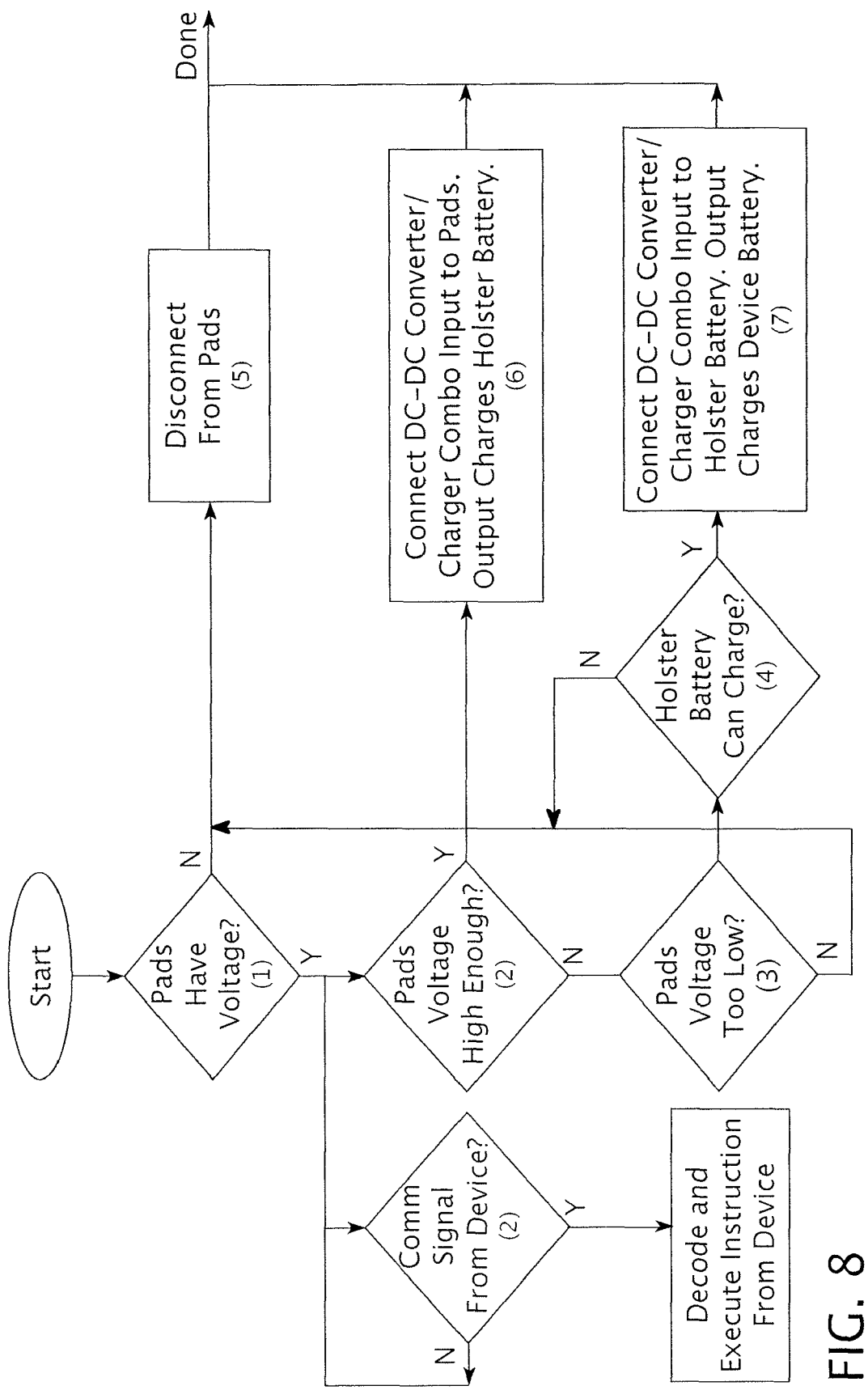
FIG. 8 is a logic flow chart of the circuitry of the holder of the electronic device described herein.
Figure 9:
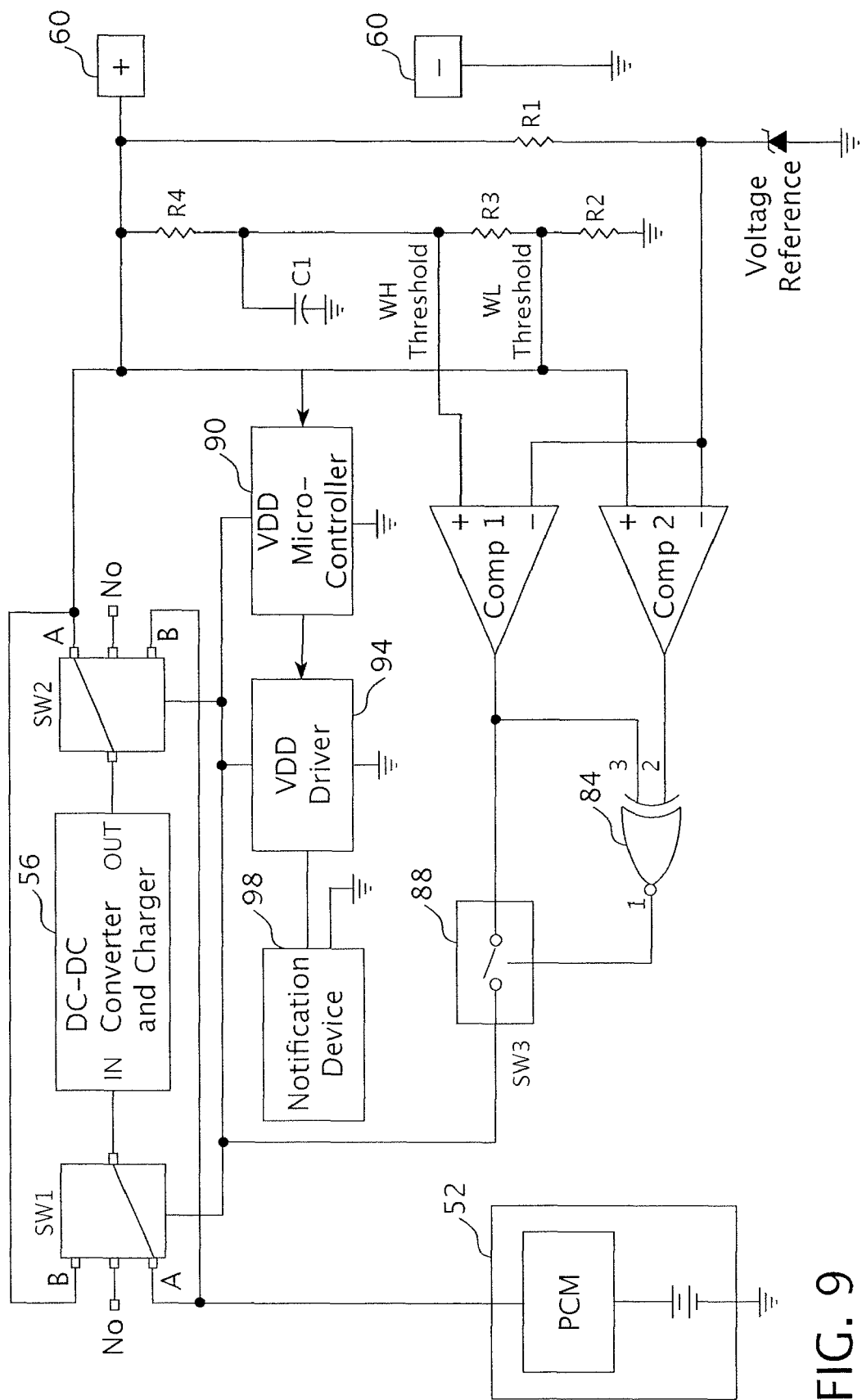
FIG. 9 is a block circuit diagram of the holder charging circuit of the handheld device described herein.

Most of the modification is made to the holster or holder 12 as illustrated in the logic flowchart shown in FIG. 8 and the circuit block diagram illustrated in FIG. 9. Referring to FIG. 8 it can be appreciated that when the handheld electronic device 8 is in the holster 12 the pads 60 will be connected to the battery 32 on the handheld electronic device 8 and will thus have a voltage on them. Normal Li-Ion batteries have voltages of about 4.2 V when fully charged. These batteries reach a discharge plateau at around 3.7V-3.8V during most of their discharge, and quickly drop during the final stages of discharge. In fact, at about 3.3 V, the cells of the battery contain less than 10% energy left in them. All of these values are room temperature values and these room temperature values will be used in this exemplary embodiment. Various other schemes can also be used to determine the state of charge of the lithium Li-Ion battery, for example Coulomb Counting could be employed, in which the amount of charge required to fill a completely discharged battery is recorded and the State of Charge (SoC) is determined by counting the amount of charge dispensed. As can be seen from FIG. 8 the algorithm for holster operation is as follows:

1. The circuit in the holder 12 determines if the handheld electronic device battery 32 can provide some charge to charge up the holster battery 52. This is primarily done by measuring the voltage of the handheld electronic device battery 32. If it is high enough (that is around 3.8 V+, meaning that the handheld electronic device battery 32 is itself fully charged), then this condition is TRUE. In this case an internal (to the holster 12) DC-DC converter/charger is used to leak off some charge to charge up the holster battery. Up to 10% of the device battery's charge is a reasonable amount to be leaked off for this purpose. The DC-DC converter is needed because most chargers need a somewhat higher voltage at their inputs than what they will provide at their outputs. So, to fully charge up a Li-Ion or Lithium polymer battery to 4.2 V, typical chargers need at least 5.0 V. Since the power source itself is a Li-Ion battery, there is a need for a DC-DC conversion to boost up the charger input.

2. If the handheld device battery 32 is in between fully charged and near empty (between approximately 3.8 V to 3.4 V) then the handheld electronic device 8 can neither provide charge to the holster, nor does it need a boost from the holster and the pads 60 are disconnected from the battery 32. In this case, the battery 32 may have reached this stage from the stage described in Paragraph 1 above, or it may already be in this state at the moment when it was holstered. In the first case, this stage provides a mechanism to stop charging in accordance with Paragraph 1 immediately above without having the holster 12 immediately switch back and forth between that set forth in Paragraph 1 above and that provided in Paragraph 3 immediately below.

3. If the handheld electronic device battery 32 is very low, then the holster battery 52 will give back some of its charge. The holster battery 52 should not give back so much of its charge that it drains itself beyond its limits. This is accomplished through the protection circuit module (PCM) which prevents the holster battery 52 from over discharging and short circuits, etc. If the holster battery 52 has enough charge, then the direction of the DC-DC converter/charger is changed, and the holster battery 52 charges the device battery 32, until the latter reaches the threshold set forth in Paragraph 2 immediately above. In this case the charging will stop.

4. If the charging pads 60 have voltage, then the microcontroller 90 on the holster 12 detects whether there is a communication signal. If a communication signal is present, then the microcontroller 90 decodes and executes the instruction from the handheld electronic device 8 microprocessor 24.

The circuit diagram in FIG. 9 implements the flow diagram illustrated in FIG. 8. Switch SW1 and SW2 perform the DC-DC converter/charger input/output reversing functions and are respectively connected to the input and the output of DC-DC converter/charger 78. Comparators COMP1 and COMP2 detect the state of the handheld electronic device battery 32. When the voltage is above the lower threshold level as inputted from the voltage divider circuit R2, R3 and R4, COMP2 outputs high. When the voltage is above the upper threshold, that is in this example 3.8 V, COMP1 turns high. In between, COMP1 will be low and COMP2 will be high. There cannot be a case where COMP1 is high and COMP2 is low. Accordingly, when the battery is near full COMP1 will be high and COMP2 will be high enabling gate 84 to provide a high input to the SW3 switch input 88. The high input closes the SW3 switch and delivers a high output to the control input terminal of SW1 and SW2 which moves both switches to connect terminal A so that the handheld electronic device 8 charges the holster battery 52. When the handheld electronic device battery 32 is in its mid range, identified in Paragraph 2 immediately above, the output of COMP1 will be low and the output of COMP2 will be high providing a low output from the gate 84 to the control input terminal 88 of switch SW3. The low input opens the switch and opens circuits both SW1 and SW2 to the NO position and no charge sharing occurs. When the handheld electronic device battery 32 is near empty the output of COMP1 and COMP2 will be low causing the control input to SW3 from the gate 84 to be high. This high input delivers a low input to the control terminals of switches SW1 and SW2 which connects the switches SW1 and SW2 to terminal B so that the holster battery 52 charges the handheld electronic device battery 32. The switching logic is summarized in the following Table 1.

TABLE 1

| State | Comp1 | Comp2 | SW3 | SW3 | Action |
| --- | --- | --- | --- | --- | --- |
| Near Full | High | High | High | High | Device charges holster |
| Mid | Low | High | X | Low | No charge sharing |
| Near Empty | Low | Low | Low | High | Holster charges device |

The X in the Table means that no output is provided since the switch SW3 under those circumstances is open circuited. Accordingly, the apparatus of this embodiment allows a holster 12 to effectively "steal" small of amounts of charge over time from a fully charged handheld electronic device 8, and hold it in reserve until required by a user, at the very low end of the primary battery charge cycle, for an additional day or two of use. The electronic device 4 described herein also can reduce the weight of the handheld electronic device 8 without compromising the battery capacity.

In the block diagram illustrated in FIG. 9, the driver 94 can be a polyphonic sound synthesizer or any other similar circuit. The notification device 98 can be a buzzer, vibrator, speaker, light emitting diode (LED) or any other annunciator or combination thereof. If a buzzer or vibrator is used, a larger and more powerful one than would normally be employed on the handheld electronic device 8 may be used since it will not add to the weight of the handheld electronic device 8. Preferably the buzzer or vibrator is located on the holster 12 adjacent to a garment clip so that the strength of the vibration is optimally transmitted to the user. The capacitor C1 at the input to the comparators Comp1 and Comp2 functions as a low-pass filter that filters out all the serial data riding on the charging pads 60 so that the charging scheme is not affected by this "noise". Preferably all the electronics on the holster 12, including the notification device 98, is powered by the holster battery 52.

Figure 10:
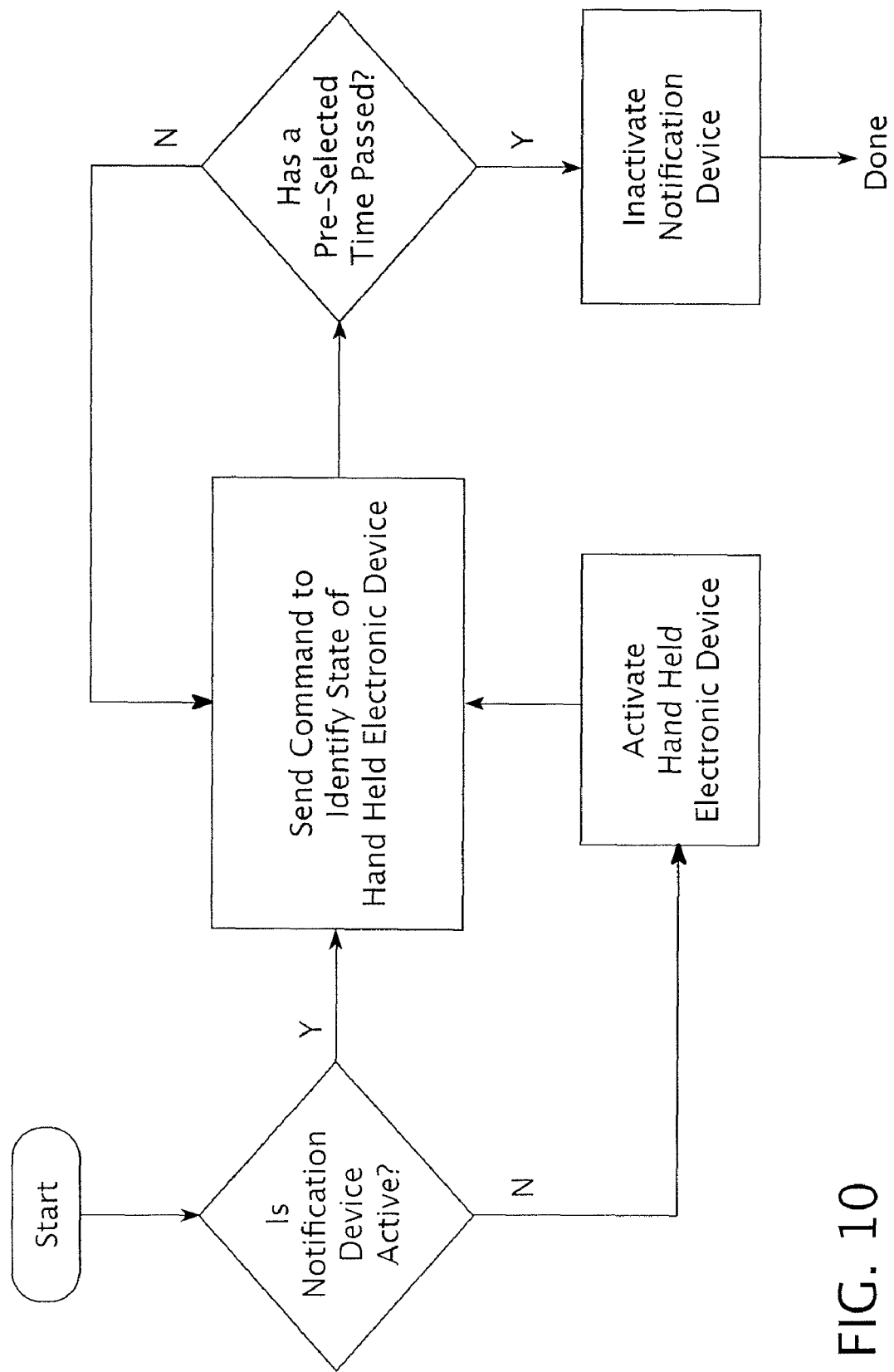
FIG. 10 is a logic flow chart of one mode of operation of the handheld electronic device described herein.

The microcontroller 90 on the holster 12 can be programmed to go to sleep or even power down, and only wake up upon detecting a communication from the microprocessor 24 on the handheld electronic device 8. This would conserve power in the battery 52 so that it could be employed to extend the charge life of the battery 32 on the handheld electronic device 8. With the ability to accept commands from the handheld electronic device 8, almost all the hardware in the decision making process as to when to charge the holster battery 52 and when to give back the holster battery charge to the device 8 can be made in software. So, in essence, everything except the DC-DC converter can be done in the microcontroller 90, under software control. Alternatively, the functions can be handled as described above with the microcontroller 90 only managing the signals received from the microprocessor 24. In another exemplary embodiment, the microcontroller 90 is programmed to enable or disable the notification device 98. Similarly, the microprocessor 24 on the handheld electronic device 8 can be programmed to enable or disable the notification device 98. This latter arrangement is illustrated in the logic flow chart shown in FIG. 10. The microprocessor 24 first identifies whether the notification device 98 is active. If the notification device 98 is active the microprocessor 24 sends a command for the notification device 98 to identify the state of the handheld electronic device 8 for a pre-selected period of time. After that pre-selected period of time has passed the notification device 98 is inactivated to conserve the power of the battery 52 (shown in FIG. 4). If the microprocessor 24 identifies that the notification device 98 is inactive, it first activates the notification device 98 before sending the command to identify the state of the handheld electronic device 8. The mode of operation, e.g., whether to disable and enable the notification device 98, can be implemented through a menu accessible on the display 20.

As an alternative to using the charging pads 36 and 60 to communicate the alert information from the microprocessor 24 to the microcontroller 90 a short-range wireless link can be employed. Many handheld electronic devices already have short-range wireless functionality, such as BLUETOOTH®, built-in. Accordingly, all a user has to do is to pair the short-range wireless device embedded in the holster 12 to the handheld electronic short-range wireless device. This would enable a user wearing an empty holster 12 to be alerted to an incoming message when the user's handheld electronic device 8 is in a cradle being charged or is in use outside the holster 12. The wireless link would also enable a user to eliminate a vibrator on the handheld electronic device 8, further reducing its weight and extending its onboard battery 32 operating time.

While specific embodiments have been described in detail it will be appreciated by those skilled in the art that various modifications and alternatives to those details could be developed in light of the overall teachings of the disclosure. Accordingly, the particular embodiments disclosed are meant to be illustrative only and not limiting as to the scope of the device and method described herein, which is to be given the full breadth of the appended claims and any or all equivalents thereof.

The invention claimed is:

1. An electronic device comprising:
a holster for releasably receiving and electrically coupling to a handheld electronic device;
a notification device disposed on said holster and for coupling to the handheld electronic device, said notification device providing a notification that identifies a pre-selected state of the handheld electronic device;
wherein the handheld electronic device inactivates the notification device after the notification device provides the notification that identifies the pre-selected state of the handheld electronic device; and
wherein the notification device is activated if the notification device is identified as being inactivated before the handheld electronic device sends a command to the notification device to provide the notification that identifies the pre-selected state of the handheld electronic device.

2. The electronic device of claim 1 wherein the notification device is programmed to have a plurality of signal patterns, each such signal pattern corresponding to a different state of the handheld electronic device.

3. The electronic device of claim 2 wherein the state of the handheld electronic device is the arrival of an email and the signal pattern corresponds to the relative importance of the email.

4. The electronic device of claim 3 wherein the importance of the email is determined by the address of a sender.

5. The electronic device of claim 1 wherein the notification device is a first vibrator.

6. The electronic device of claim 1 wherein the notification device is an LED.

7. The electronic device of claim 1 wherein the notification device is a speaker.

8. The electronic device of claim 1 wherein the coupling between the notification device and the handheld electronic device is one or more electrical contacts or a wireless connection.

9. The electronic device of claim 1 wherein the coupling is a short-range wireless connection.

10. The electronic device of claim 1 wherein said notification device provides a signal that identifies the pre-selected state of the handheld electronic device when said handheld electronic device is in said holster.

11. An electronic device comprising:
a holster for releasably receiving and electrically coupling to a handheld electronic device;
a notification device disposed on said holster and for coupling to the handheld electronic device, said notification device providing a notification that identifies a pre-selected state of the handheld electronic device;
wherein the handheld electronic device inactivates the notification device after the notification device provides the notification that identifies the pre-selected state of the handheld electronic device; and
wherein the state of the notification device is checked to see if it is active before the notification device provides the notification that identifies the pre-selected state of the handheld electronic device.

12. A method of operating a holster for conveniently carrying a handheld electronic device, the holster having a notification device disposed thereon, comprising the steps of:
coupling the notification device to the handheld electronic device;
providing a signal from the notification device disposed on the holster, that identifies a pre-selected state of the handheld electronic device;
wherein the handheld electronic device inactivates the notification device after the notification device provides the notification that identifies the pre-selected state of the handheld electronic device; and
wherein the notification device is activated if the notification device is identified as being inactivated before the handheld electronic device sends a command to the notification device to provide the notification that identifies the pre-selected state of the handheld electronic device.

13. The method of claim 12 wherein coupling the notification device to the handheld electronic device is via one or more electrical contacts.

14. The method of claim 12, further comprising programming the signal provided by the notification device to have a plurality of signal patterns each such signal pattern corresponding to a different state of the handheld electronic device.

15. The method of claim 12 wherein the state of the handheld electronic device is the arrival of an email and the signal pattern corresponds to the relative importance of the email.

16. The method of claim 12 including the step of determining the importance of the email from the address of the sender.

17. The method of claim 12 wherein the coupling the notification device to the handheld electronic device comprises wirelessly connecting the notification device to the handheld electronic device.

18. The method of claim 12 wherein coupling the notification device to the handheld electronic device is via a short-range wireless connection.

19. A method of operating a holster for conveniently carrying a handheld electronic device, the holster having a notification device disposed thereon, comprising the steps of:

coupling the notification device to the handheld electronic device;

providing a signal from the notification device disposed on the holster, that identifies a pre-selected state of the handheld electronic device;

wherein the handheld electronic device inactivates the notification device after the notification device provides the notification that identifies the pre-selected state of the handheld electronic device; and wherein the state of the notification device is checked to see if it is active before the notification device provides the notification that identifies the pre-selected state of the handheld electronic device.

* * * * *

UNITED STATES PATENT AND TRADEMARK OFFICE
CERTIFICATE OF CORRECTION

PATENT NO. : 8,179,093 B2
APPLICATION NO. : 12/952419
DATED : May 15, 2012
INVENTOR(S) : Jacek S. Idzik and Siong Li Ting Tun Page 1 of 1

It is certified that error appears in the above-identified patent and that said Letters Patent is hereby corrected as shown below:

In the Claims:

In column 11, line 4, the claim should read "16. The method of claim 15 including the step of determining the importance of the email from the address of the sender."

Signed and Sealed this
Twenty-seventh Day of August, 2013

Teresa Stanek Rea
*Acting Director of the United States Patent and Trademark Office*